(12) United States Patent
Moss et al.

(10) Patent No.: US 11,036,941 B2
(45) Date of Patent: Jun. 15, 2021

(54) GENERATING A PLURALITY OF DOCUMENT PLANS TO GENERATE QUESTIONS FROM SOURCE TEXT

(71) Applicant: INTERNATIONAL BUSINESS MACHINES CORPORATION, Armonk, NY (US)

(72) Inventors: Nicholas B. Moss, Atlanta, GA (US); Donna K. Byron, Petersham, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 16/364,094

(22) Filed: Mar. 25, 2019

(65) Prior Publication Data
US 2020/0311212 A1    Oct. 1, 2020

(51) Int. Cl.
*G06F 40/56* (2020.01)
*G06N 20/00* (2019.01)
*G06F 16/2455* (2019.01)
*H04L 12/58* (2006.01)
*G06F 40/30* (2020.01)
*G06F 40/295* (2020.01)
(Continued)

(52) U.S. Cl.
CPC ........ *G06F 40/56* (2020.01); *G06F 16/24558* (2019.01); *G06F 40/295* (2020.01); *G06F 40/30* (2020.01); *G06N 20/00* (2019.01); *H04L 51/32* (2013.01); *G06F 16/288* (2019.01); *G06F 16/3344* (2019.01)

(58) Field of Classification Search
None
See application file for complete search history.

(56) References Cited

U.S. PATENT DOCUMENTS 5,181,163 A * 1/1993 Nakajima ............. G06F 40/242
                                                    704/10
9,704,102 B2 * 7/2017 Baraniuk ............... G06N 20/00
(Continued)

OTHER PUBLICATIONS

Gatt et al., "SimpleNLG: A realisation engine for practical applications", Proceedings of the 12th European Workshop on Natural Language Generation, pp. 90-93.
Heilman et al., "Extracting Simplified Statements for Factual Question Generation", Language Technologies Institute, Carnegie Mellon University, pp. 10.
Heilman et al.,, "Question Generation via Overgenerating Transformations and Ranking", Language Technologies Institute School of Computer Science, Carnegie Mellon University, 2009, pp. 15.
(Continued)

*Primary Examiner* — Richard Z Zhu
(74) *Attorney, Agent, or Firm* — Konrad Raynes Davda & Victor LLP; David W. Victor (57) ABSTRACT

Provided are a computer program product, system, and method for generating a plurality of document plans to generate questions from source text. The declarative source text is processed to generate a plurality of document plan data structures. To generate each document plan data structure, at least a portion of the declarative source text is included in the document plan data structure. A determination is made of at least one relation of arguments in the declarative source text. The determined at least one relation and the arguments are indicated in the document plan data structure. Entity types of the arguments are determined and indicated in the document plan data structure. A natural language generation module processes each of the document plan data structures to generate a plurality of questions, which are stored with the declarative source text.

20 Claims, 9 Drawing Sheets

(51) Int. Cl.
*G06F 16/28* (2019.01)
*G06F 16/33* (2019.01)

(56) References Cited

U.S. PATENT DOCUMENTS

| | | | | |
|---|---|---|---|---|
| 10,303,798 | B2* | 5/2019 | Stubley | G06F 16/243 |
| 2007/0061703 | A1* | 3/2007 | Kambhatla | G06F 40/169 |
| | | | | 715/234 |
| 2011/0066587 | A1* | 3/2011 | Ferrucci | G06N 5/04 |
| | | | | 706/54 |
| 2011/0125734 | A1* | 5/2011 | Duboue | G09B 7/00 |
| | | | | 707/723 |
| 2012/0216114 | A1* | 8/2012 | Privault | G06F 3/04883 |
| | | | | 715/702 |
| 2013/0144606 | A1* | 6/2013 | Birnbaum | G06F 40/40 |
| | | | | 704/9 |
| 2014/0365502 | A1* | 12/2014 | Haggar | G06N 5/02 |
| | | | | 707/748 |
| 2015/0026163 | A1* | 1/2015 | Haggar | G06F 16/24578 |
| | | | | 707/723 |
| 2017/0032249 | A1* | 2/2017 | Chougule | G06F 16/288 |
| 2017/0323204 | A1* | 11/2017 | Akbulut | G06F 16/334 |
| 2018/0039633 | A1* | 2/2018 | Miyoshi | G06F 40/247 |
| 2018/0121554 | A1* | 5/2018 | Finberg | G06F 16/90328 |

OTHER PUBLICATIONS

Mani, et al., "Hi how can I help you?: Automating enterprise IT support help desks", Association for the Advancement of Artificial Intelligence, 2018, pp. 9.

Mannem, et al, "Question Generation from Paragraphs at UPENN: QGSTEC System Description", Proc. ITS Workshop on Question Generation, 2010, pp. 84-91.

Olney, et al., "Question Generation from Concept Maps", Dialogue and Discourse 3(2) (2012) 75-99, 2012, pp. 25.

Razzaghi, et al., "Context Free Frequently Asked Questions Detection Using Machine Learning Techniques", IEEE/WIC/ACM International Conference on Web Intelligence, 2016, pp. 4.

Reiter, et al., "Building Applied Natural Language Generation Systems", Cambridge University Press, 1995, pp. 32.

Sleimi, et al., "Generating Paraphrases from DBPedia using Deep Learning", [online] [retrieved Mar. 7, 2019] pp. 5 https://aclweb.org/anthology/W16-3511.

"Realization linguistics", Wikipedia, [online][retrieved Mar. 16, 2019] pp. 2, https://en.wikipedia.org/wiki/Realization_(linguistics).

"Natural-language generation", Wikipedia, [online][retrieved Mar. 15, 2019] pp. 6, https://en.wikipedia.org/wiki/Natural-language_generation.

U.S. Appl. No. 15/832,192, filed Dec. 5, 2017.

* cited by examiner

FIG. 1

Document Plan Data Structure

FIG. 2

Relation Information

FIG. 3

{
Sentence: Leonardo DiCaprio was awarded Best Actor for his role in a motion picture.
Relation: [Type: AFFECTEDBY
Score: 0.857379
Arguments: [Text: Leonardo DiCaprio
Entities: [Type: PERSON
Text: Leonardo DiCaprio],
Text: awarded
Entities: [Type: ENTERTAINMENTAWARD
Text: awarded]],
Type: AWARDEDTO
Score: 0.905199
Arguments: [Text: Best Actor
Entities: [Type: ENTERTAINMENTAWARD
Text: Best Actor],
Text: Leonardo DiCaprio
Entities: [Type: PERSON
Text: Leonardo DiCaprio]]]
Semantic Parse: [Subject: Leonardo DiCaprio
Object: awarded Best Actor for his role in a motion picture
Verb: Text: was
Tense: past
Lemma: be]
}

FIG. 4

{
Sentence: Salzburg, Austria was the location of Mozart's employment as a court musician where he wrote many famous musical compositions.
Relation: [Type: AFFECTEDBY
Score: 0.808842
Arguments: [Text: Mozart
Entities: [Type: PERSON
Text: Mozart],
Text: employment
Entities: [Type: EVENTJOB
Text: employment]]]
Semantic Parse: [Subject: Salzburg, Austria
Object: the location of Mozart's employment as a court musician
Verb: Text: was
Tense: past
Lemma: be,
Subject: he
Object: many famous musical compositions
Verb: Text: wrote
Tense: past
Lemma: wrote]

FIG. 5

```
Plan:
  Sentence: ACME builds cars in Japan.
  Relation:
    [
        Type: LOCATEDAT
        Score: 0.831787
        Arguments:
        [
            Text: cars
            Entities:
            [
               Type: VEHICLE
               Text: cars
            ],
            Text: Japan
            Entities:
            [
               Type: GEOPOLITICALENTITY
               Text: Japan
            ]
        ]
    ]
  Semantic Parse:
  [
      Subject: ACME
      Object: cars
      Verb:
            Text: builds
            Tense: present
            Lemma: build
  ]
```

GENERATING A PLURALITY OF DOCUMENT PLANS TO GENERATE QUESTIONS FROM SOURCE TEXT

BACKGROUND OF THE INVENTION

1. Field of the Invention

The present invention relates to a computer program product, system, and method for generating a plurality of document plans to generate questions from source text.

2. Description of the Related Art

Natural language generation (NLG) is a subfield of artificial intelligence and computational linguistics that is used to produce understandable text. A subfield of NLG is question generation, which uses the NLG algorithms to generate questions based on source text. This allows questions to be generated that are closely tied to a particular domain as represented in the source text from which the question are generated. Question generation may further be used to generate Frequently Asked Questions (FAQ) lists for a source text, such that the source text from which the questions are generated can be associated with and returned as an answer to the FAQ questions generated from the source text.

There is a need in the art for improved techniques for generating questions with NLG systems.

SUMMARY

Provided are a computer program product, system, and method for generating a plurality of document plans to generate questions from source text. The declarative source text is processed to generate a plurality of document plan data structures from the declarative source text. To generating each document plan data structure, at least a portion of the declarative source text used to generate the document plan data structure is included in the document plan data structure. A determination is made of at least one relation of arguments in the declarative source text. The at least one relation holds with respect to the arguments of the determined at least one relation. The determined at least one relation and the arguments of the determined at least one relation are indicated in the document plan data structure. Entity types of the arguments are determined and the determined entity types for the arguments of each determined relation are indicated in the document plan data structure. A natural language generation module processes each of the document plan data structures to generate a plurality of questions. The questions are stored with the declarative source text.

DETAILED DESCRIPTION

Described embodiments provide improvements to computer technology for natural language generation systems used to generate questions for a domain specific source text. Described embodiments provide for the generation of multiple document plans for declarative source text to expand the number of relations and arguments represented in the document plans that in turn may be used to increase the number of domain specific questions generated for the source text. Each generated document plan data structure includes a portion of the declarative source text, such as a sentence or other grouping of words. A determination is made of at least one relation of arguments in the declarative source text and indication is made of the determined relations and their arguments, wherein the at least one relation holds with respect to the arguments of the determined at least one relation in the document plan data structure, along with determined entity types for the arguments, such as the subject and object of the relation. The multiple generated document plans providing different relations and arguments in the source text are then processed to generate a plurality of questions that are based on the relations in the source text.

By generating the questions based on the content of the source text, which may be domain specific, questions are generated that are specific to eliciting as a response the source text used to generate the questions. Further, the generated domain specific questions may be used to train chatbots, natural language processors and other user interactive modules, to identify questions that are the same or similar to generated questions that can be answered from the source text from which the questions are generated.

Figure 1:
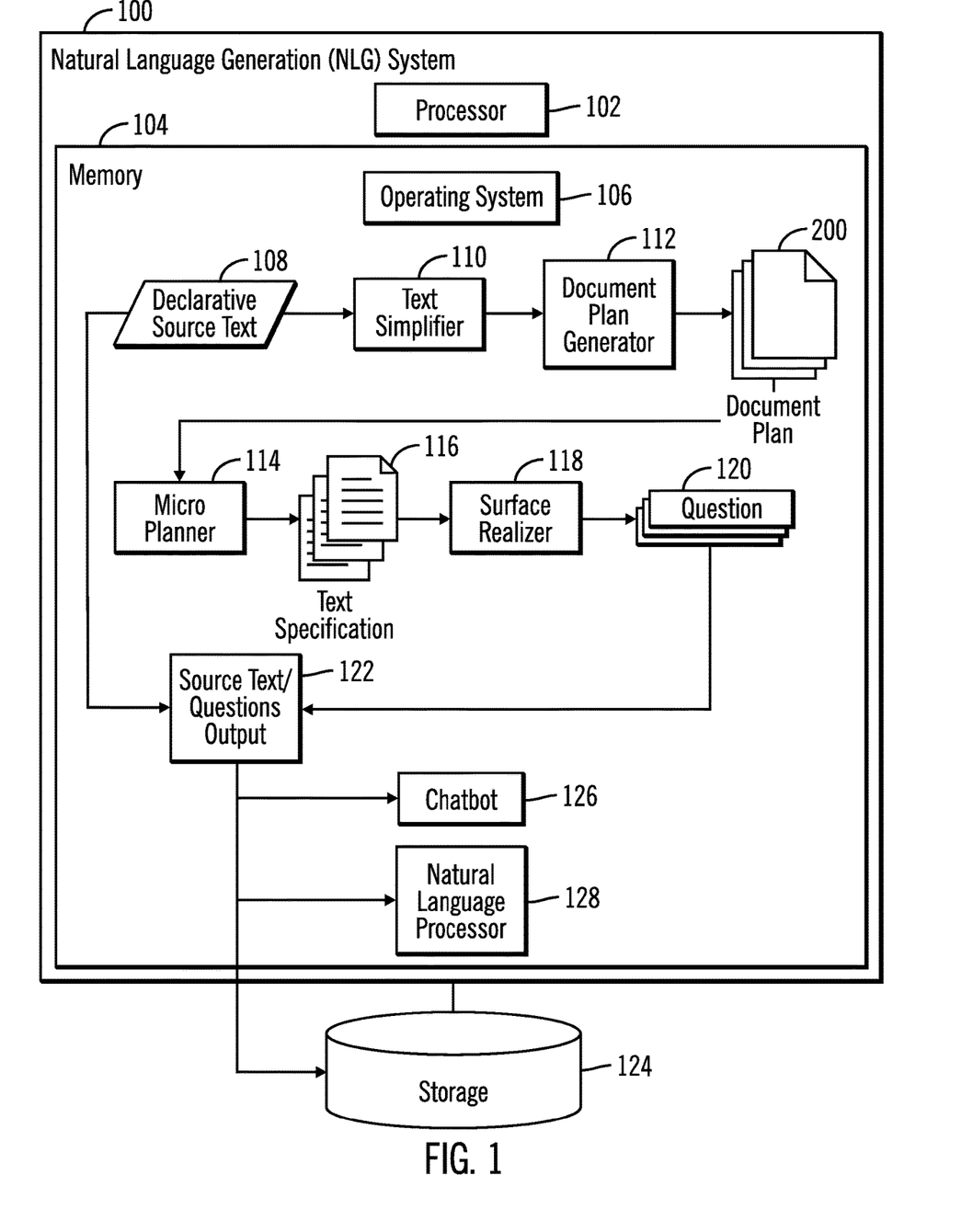
FIG. 1 illustrates an embodiment of a natural language generation system.

FIG. 1 illustrates an embodiment of a natural language generation (NLG) system 100 in which embodiments are implemented. The natural language generation system 100 includes a processor 102 and a main memory 104. The main memory 104 includes various program components and data, including: an operating system 106; declarative source text 108, such as one or more sentences of random natural language text, such as from encyclopedias, web pages, product marketing materials, etc. for which the questions will be generated; a text simplifier 110 to process the declarative source text 108 to simplify the text; a document plan generator 112 to generate a plurality of document plan data structures 200 providing high level information plans from the source text for generating the questions; a micro planner 114 to replace tags and descriptors in the document plans 200 with natural language words to create a text specification 116 for each document plan 200; a surface realizer 118 to process the text specifications 116 to generate the questions 120.

The text simplifier 110 may convert individual sentences in the declarative source text 108 into one or more distinct sentences where the syntactic structure is flattened and some reduced semantic arguments are made explicit in the text, e.g., split a conjunction into two separate sentences, or resolving reduced noun phrases (ellipsis or pronouns) to place full mentions explicitly into the output sentences. The document plan generator 112 uses natural language understanding (NLU) algorithms to convert the source text into high level information plans by performing information extraction to determine what content should be present in resulting questions, including defining argument structure, resolves entity references, and provides semantic class labels for content terms. The micro planner 114 processes the document plans 200 to perform lexicalization to select the words in the simplified text to express the domain specific concepts based on relation and entity elements in the document plan 200, select the domain specific words to use, to perform referring expression generation, and select the interrogative type needed to form the questions, e.g., a what, who or how question, to include in the text specification 116 for each document plan 200. The surface realizer 118 applies rules of grammar to produce questions that are syntactically, morphologically, and orthographically correct. Examples of surface realizers 118 include SURGE, RealPro, KPML, SimpleNLG, etc.

The questions 120 may then be provided with the corresponding declarative source text 108 to provide source text/questions output 122 that may be stored in storage 124 for later use. In one embodiment the source text/questions output 122 may be used to train a chatbot 126, comprising a software program that conducts a conversation with a user, such as on a web site, to respond with the source text 108 in response to receiving the generated questions 120. In a further embodiment, the source text/questions output 122 may be used to train a natural language processor (NLP) 128, also known as machine learning modules, to generate the source text 108 as output in response to receiving each of the generated questions 120.

In addition to using the output questions 120 to train chatbots 126 and natural language processors 128, in further embodiments, the generated questions 120 may comprise questions for an educational or vocational test having an answer comprising the source text 108.

Still further businesses and other organizations may apply the natural language generation embodiments to generate questions for a Frequently Asked question (FAQ) list deployed on a business website to allow a return of the source text 108 from which the questions are generated as an answer to user selection of one of the FAQ questions generated based on the source text.

The memory 104 may comprise suitable volatile or non-volatile memory devices.

The storage 124 may comprise a non-volatile storage device, such as one or more of a solid state drive (SSD), hard disk drive, and other types of storage devices, which may further be configured from an array of devices, such as Just a Bunch of Disks (JBOD), Direct Access Storage Device (DASD), Redundant Array of Independent Disks (RAID) array, virtualization device, etc.

Generally, program modules, such as the program components 106, 108, 110, 112, 200, 114, 116, 118, 120, 122, 126, and 128 may comprise routines, programs, objects, components, logic, data structures, and so on that perform particular tasks or implement particular abstract data types. The program components and hardware devices of the natural language generation system 100 may be implemented in one or more computer systems, where if they are implemented in multiple computer systems, then the computer systems may communicate over a network.

The program components 106, 110, 112, 114, 118, 126, and 128 may be accessed by the processor 102 from the memory 104 to execute. Alternatively, some or all of the program components 106, 110, 112, 114, 118, 126, and 128 may be implemented in separate hardware devices, such as Application Specific Integrated Circuit (ASIC), Field Programmable Gate Arrays (FPGAs) and other hardware devices.

The functions described as performed by the program components 106, 110, 112, 114, 118, 126, and 128 may be implemented as program code in fewer program modules than shown or implemented as program code throughout a greater number of program modules than shown.

Certain of the components, such as the text simplifier 110, document plan generator 112, micro planner 114, surface realizer 118, chatbot 126, and NLP 128 may use machine learning and deep learning algorithms to process text to produce the specified output and may comprise machine learning modules, such as artificial neural network programs. A neural network may be trained using backward propagation to adjust weights and biases at nodes in a hidden layer to produce a desired/correct categorization or outcome given the input. The machine learning modules of the programs 110, 112, 114, 118, 126, and 128 may implement a machine learning technique such as decision tree learning, association rule learning, artificial neural network, inductive programming logic, support vector machines, Bayesian models, etc.

The arrows shown in FIG. 1 between the components in the memory 104 represent a data flow between the components.

Figure 2:
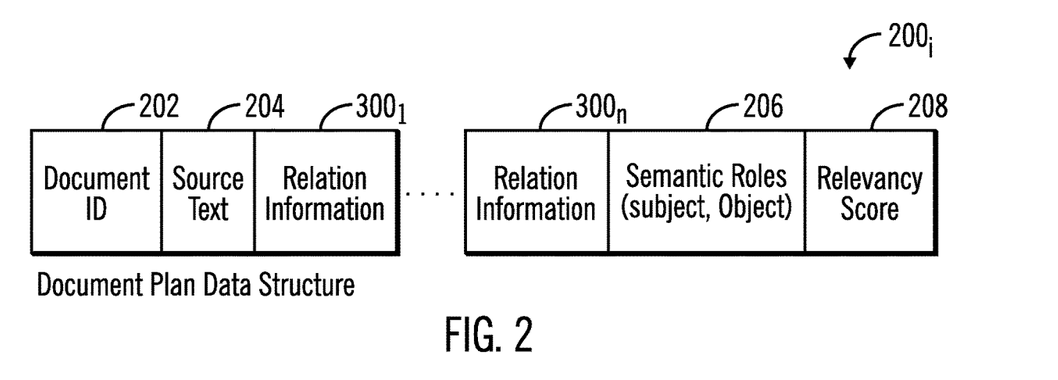
FIG. 2 illustrates an embodiment of a document plan data structure.

FIG. 2 illustrates an embodiment of an instance of a document plan data structure $200_i$ generated by the document plan generator 112 including: a document identifier (ID) 202; a portion of the declarative source text 108 on which the document plan is generated, such as a sentence or other group of words in the source text 204, such as a group having at least one predicate; one or more instances of relation information $300_1 \ldots 300_n$, including a relation that holds with respect to arguments;

semantic roles 206 of the arguments in the relations, such as subject, object, verb, etc.; and a relevancy score 208 of the document plan $200_i$ based on a strength and relevancy of the relations $300_1 \ldots 300_n$ in the document plan $200_i$ with respect to the source text 108 content.

Figure 3:
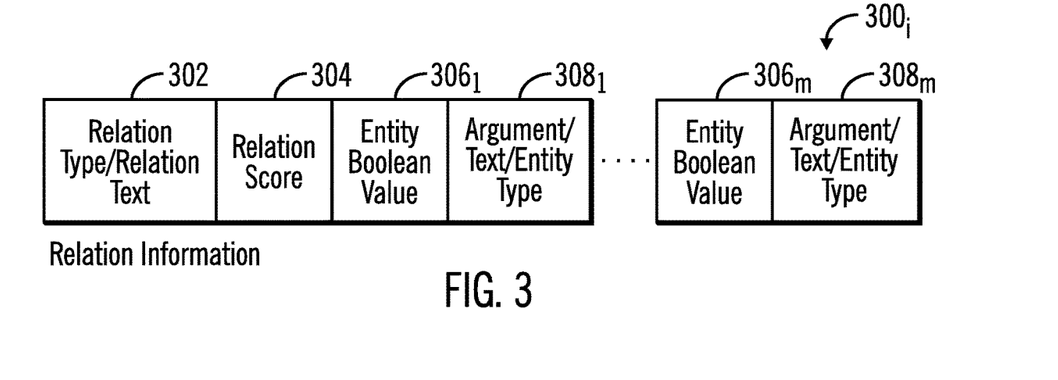
FIG. 3 illustrates an embodiment of relation information in a document plan data structure.

FIG. 3 illustrates an embodiment of an instance of relation information $300_i$ having information on a relation in the source text 204, and including: a relation type/relation text 302 pair of a relation type, as determined from a domains specific list of possible relation types, and relation text 302 comprising text in the source text 204 functioning as a relation in the text 204; a relation score 304 indicating a strength of the relation 302 in the text 204; and pair of one or more instances of an entity Boolean value $306_i$ indicating whether an entity type, for a domain of the source text 204, is provided for an argument/text/entity type $308_i$ tuple. If the entity Boolean value $306_i$ indicates true for an argument having argument text, then an entity type is further specified in the tuple 3081, else if the entity Boolean value $306_i$ is false, then no entity type is specified for the argument text for that argument.

Figure 4:
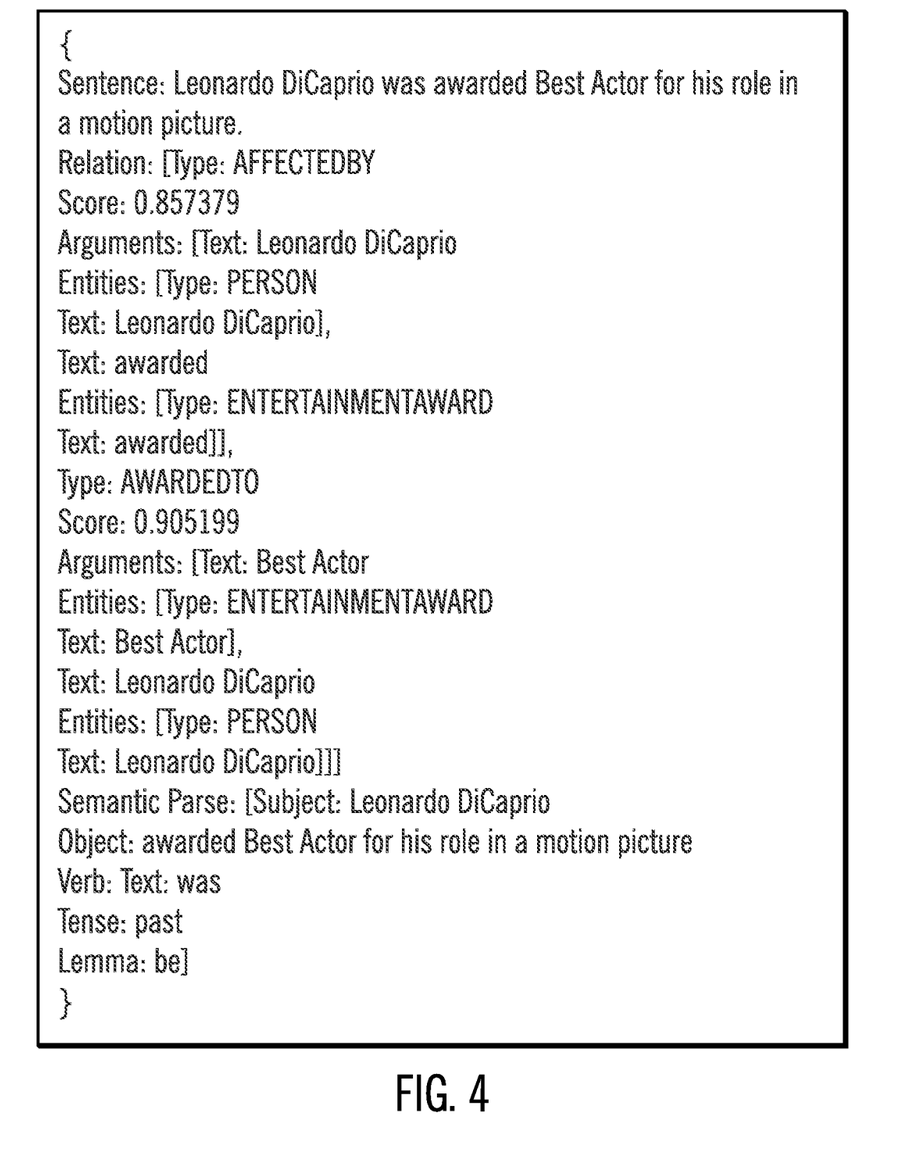
FIGS. 4, 5, and 6 illustrate examples of document plan data structures.
Figure 5:
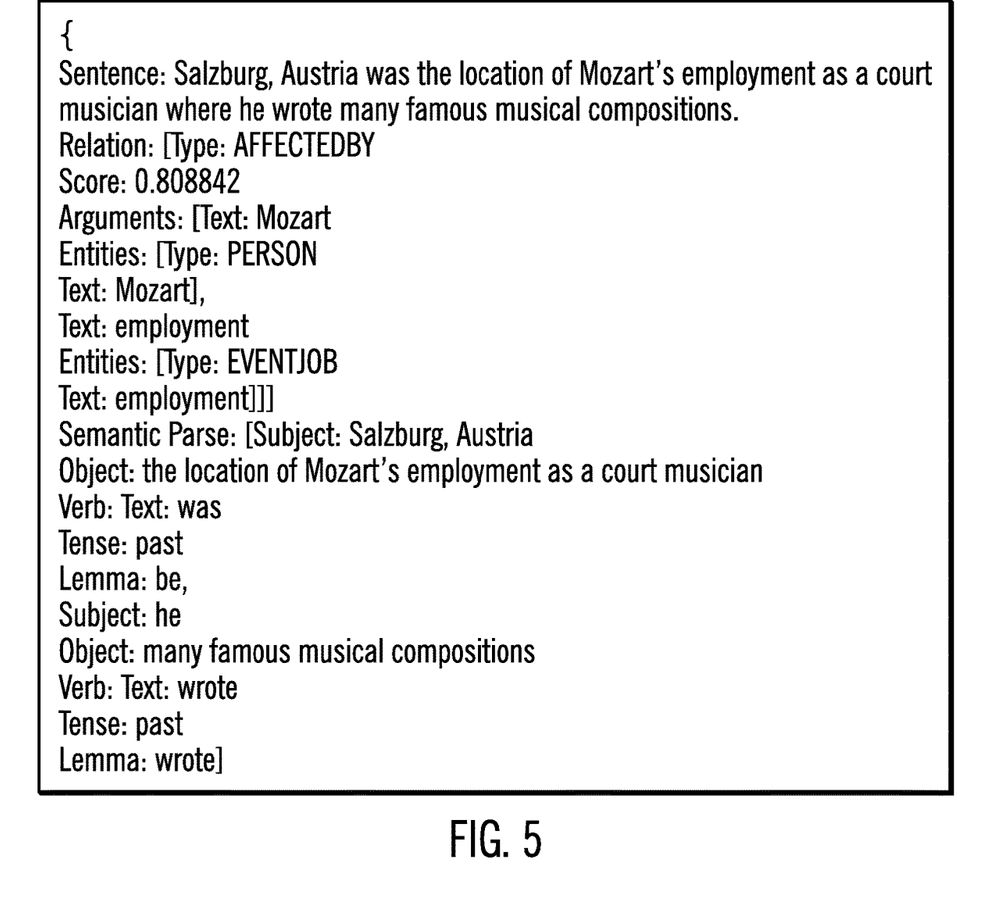
Figure 6:
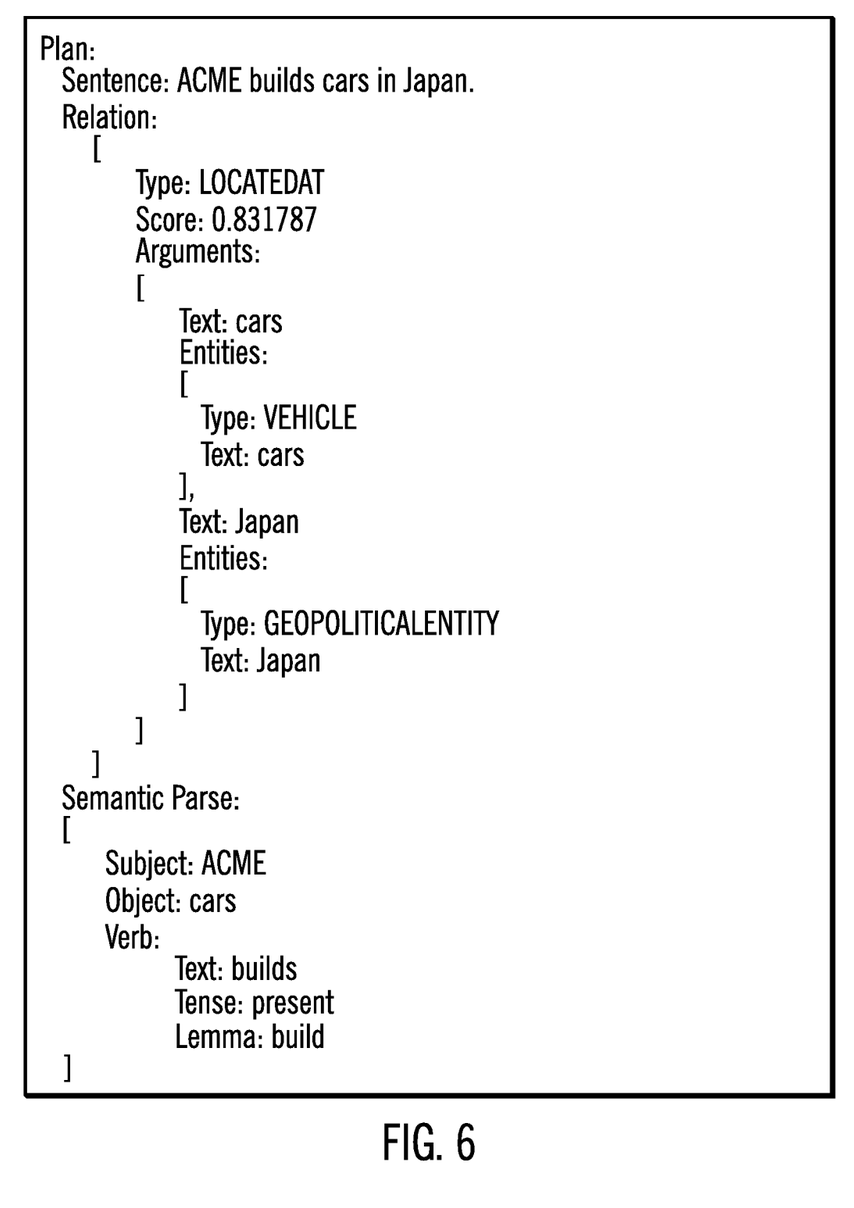

FIGS. 4, 5, and 6 provide examples of a document plan data structure $200_i$, by providing relations, arguments for the relation, entity types of the arguments, semantic roles, such as subject, object verb that is determined for a sentence on which the document plan is based.

Figure 7A:
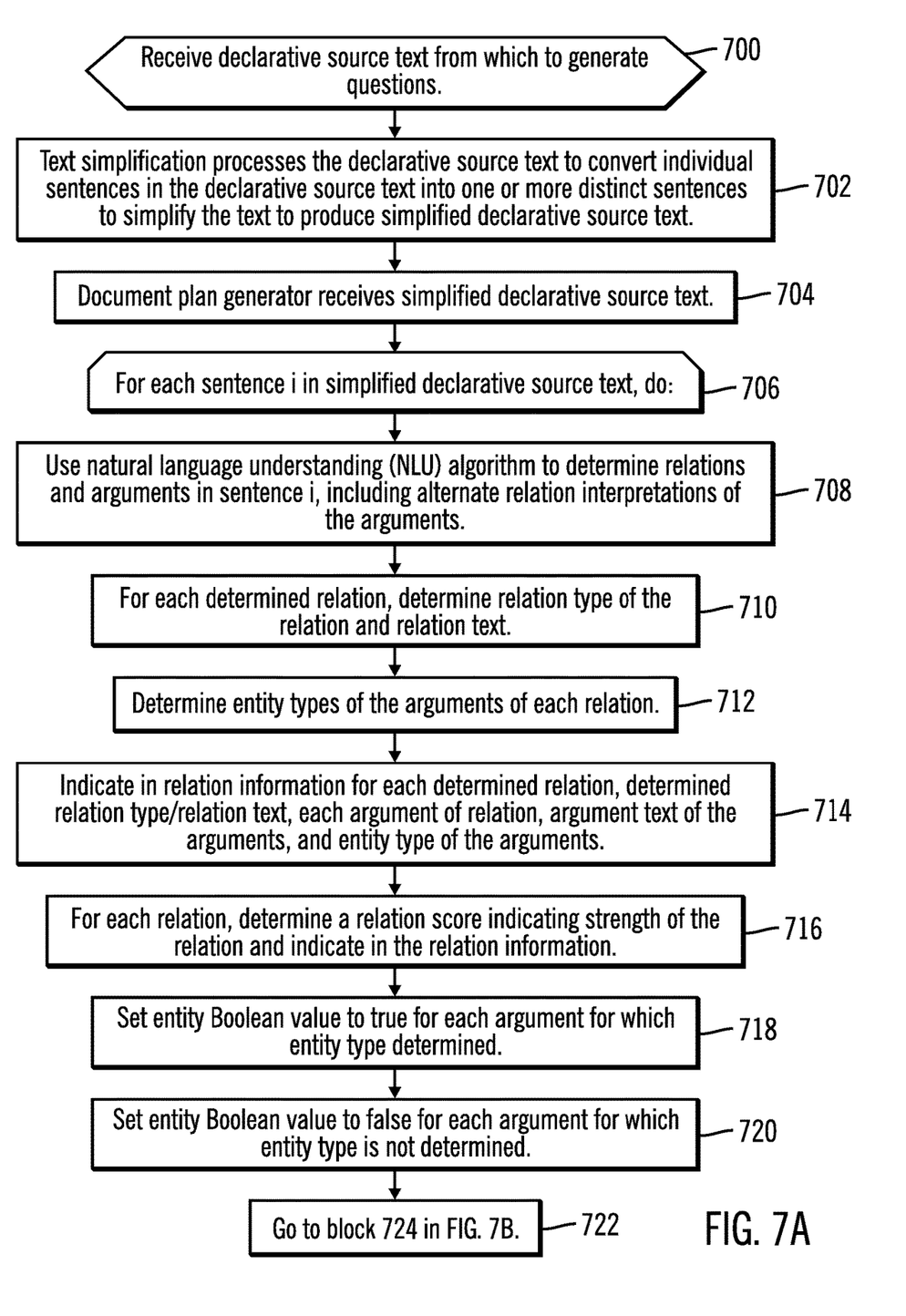
FIGS. 7a and 7b illustrate an embodiment of operations to generate multiple document plan data structures to generate questions from source text.
Figure 7B:
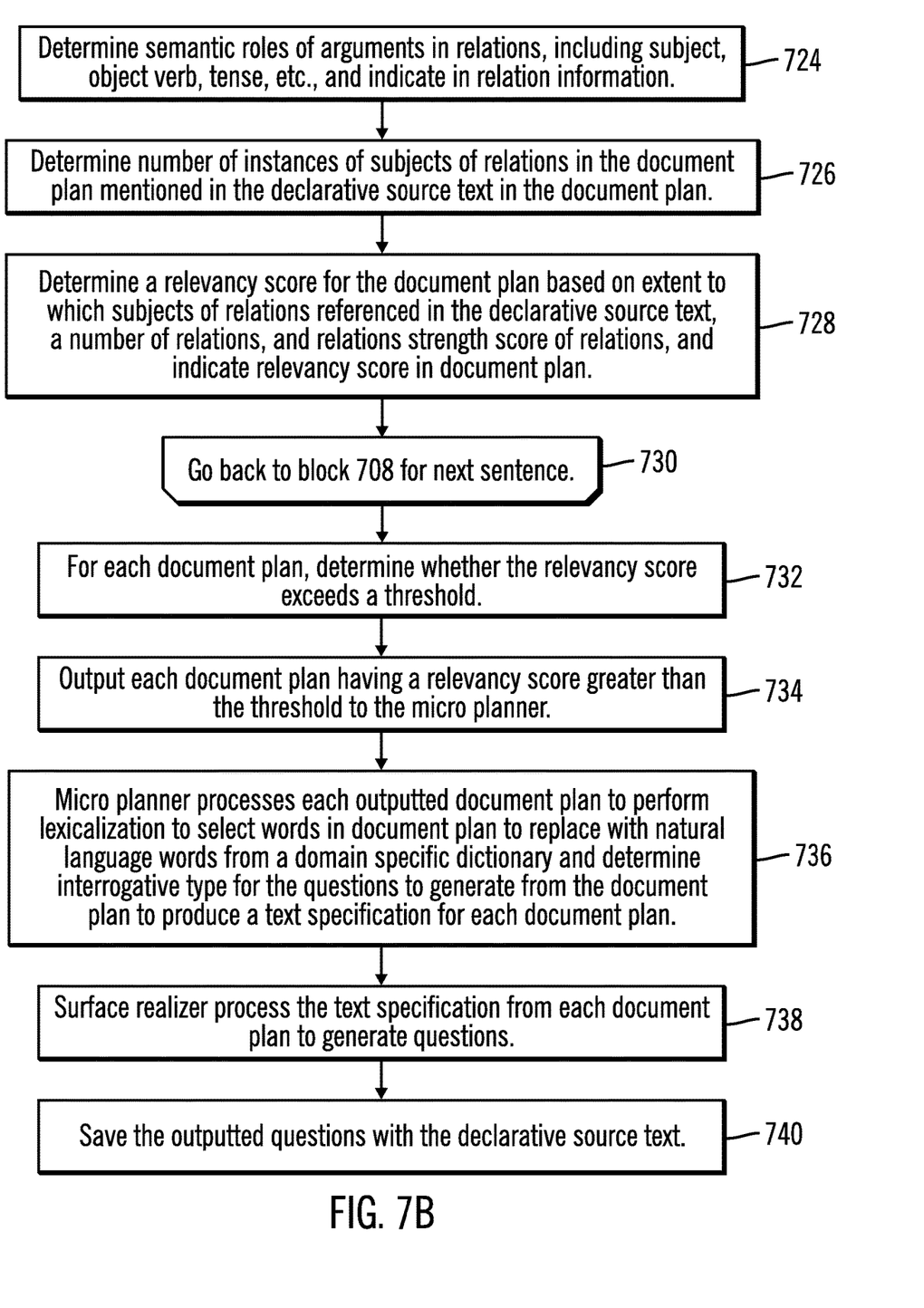

In one embodiment, if source text has multiple sentences, then one document plan data structure $200_i$ may be generated for each sentence. If a sentence is comprised of multiple relations, then the multiple relations may be indicated in different instances of relation information $300_i$ in the document plan data structure. Further, multiple instances of relation information $300_i$ in the document plan data structure may be provided when there are different interpretations of relations for the same arguments. In alternative embodiments, document plans may be generated for groups of words in sets or portions of the source text 108 other than sentences FIGS. 7a and 7b illustrate an embodiment of operations performed by the NLG components, including the text simplifier 110, document plan generator 112, micro planner 114, and surface realizer 118, and/or other components, to generate questions from source text. Upon receiving declarative source text 108 from which to generate questions, the text simplifier 110 processes (at block 702) the declarative source text 108 to convert individual sentences in the declarative source text into one or more distinct sentences to simplify the text to produce simplified declarative source text 108. The document plan generator 112 receives (at block 704) the simplified declarative source text 108 and performs a loop of operations at blocks 708 through 730 for each sentence in the declarative source text $108_S$. The document plan generator 112 uses (at bock 708) natural language understanding (NLU) algorithms to determine relations and arguments in the sentence i (or other portion of the source text 108), including alternate relation interpretations of the arguments. For each determined relation, determinations are made (at blocks 710 and 712) of a relation type of the relation, relation text in the sentence, and entity types of the arguments in the determined relations. The document plan generator 112 indicates (at block 714) in relation information $300_i$, in the document plan data structure $200_i$, for each determined relation, determined relation type/relation text 302, each argument of the relation, and for each argument of the relation, argument text and entity type $308_i$, if determined.

For each relation, a determination is made (at block 716) of a relation score indicating a strength of the relation, which is indicated as relation score 304 in the relation information $300_i$. The relation score 304 indicates a strength of the relation between the arguments. An entity Boolean value $306_i$ is set (at block 718) to true for each argument for which entity type is determined and set (at block 720) to false for each argument for which the entity type is not determined. Control then proceeds (at block 722) to block 724 in FIG. 7b to determine (at block 724) semantic roles of arguments in relations, including subject, object verb, tense, etc., and indicate those semantic roles 206 in the document plan data structure $200_i$. A determination is made (at block 726) of a number of instances of subjects of relations in the document plan $200_i$ being generated that are mentioned in the declarative source text 108. A relevancy score 208 is determined (at block 728) for the document plan $200_i$ based on extent to which subjects of relations referenced in the declarative source text 108, a number of relations, and relations strength score 304 of relations $300_i$, which is indicated in the document plan 2001. For instance, relatively more relations, more references to the subjects of relations in the source text 108, and greater strength scores 304 increases the relevancy score 208 for the document plan $200_i$, whereas relatively fewer relations, fewer references to subjects of relations in the source text 108 and lower strength scores 304 decreases the relevancy score 208 for the document plan $200_i$. Control returns (at block 730) to block 708 to generate another document plan data structure $200_i$ for a next sentence in the declarative source text 108 until all sentences (or other groupings of words) in the source text 108 are processed.

After generating the document plans 200 for the sentences, a determination is made (at block 732) whether the relevancy score 208 for each document plan $200_i$ exceeds a threshold. Each document plan $200_i$ having a relevancy score 208 greater than the threshold is outputted (at block 734) to the micro planner 114. Other criteria may be used to filter the document plans, such as to not output document plans $200_i$ that have entity Boolean values $306_i$ indicating an entity type could not be determined for an argument or if the arguments and relations are not suitable for a specific use case.

The micro planner 114 processes (at block 736) each outputted document plan $200_i$ to perform lexicalization to select words in document plan to replace with natural language words from a domain specific dictionary and determine interrogative type for the questions to generate from the document plan to produce a text specification $116_i$ for each received document plan $200_i$. The surface realizer 118 processes (at block 738) each text specification $116_i$ to generate the questions 120. The outputted questions 120 and declarative source text 108 may be saved as combined information 122.

With the embodiments of FIGS. 7a and 7b, multiple document plans specifying different relations for different portions of the declarative source text 108, such as one document plan for each sentence, are determined. By providing discrete document plan data structures, the micro planner 114 and surface realizer 118 may generate different questions based on the different relations for the different parts of the source text 108 as indicated in multiple document plans $200_i$. Using different document plans allows the micro planner 114 to generate different text $116_i$ specifications for different parts of the source text 108 to increase the number of relevant questions 120 that are generated.

In described embodiments, one document plan data structure was generated for the relations in each sentence of the declarative source text 108. In alternative embodiments, a document plan may be generated for different portions or sub-parts of a sentence, such as a phrase, group of phrases etc., to provide different groupings of the text in the source text 108 other than a sentence grouping.

Figure 8:
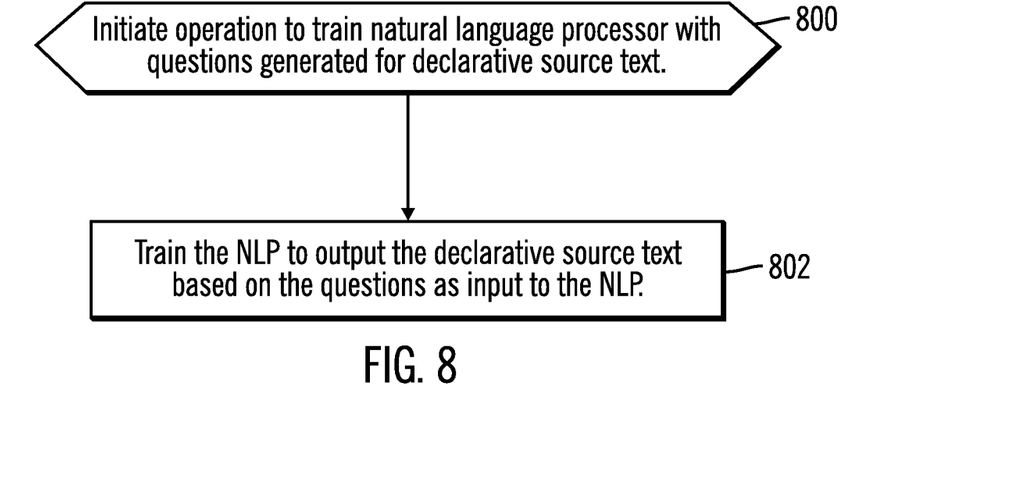
FIG. 8 illustrates an embodiment of operations to use generated questions to train a natural language processor.

FIG. 8 illustrates an embodiment of operations to use the outputted questions/source text 120 to train a natural language processor 128, implemented as a machine learning module. Upon initiating (at block 800) operations to train the NLP 128, the NLP 128 is trained (at block 802) to output the declarative source text 108 based on the questions 120 as input to the NLP 128. This will train the NLP 128 to recognize that for questions that are semantically similar to or the same as questions 120 used in training, that the output should be related to the source text 108 from which the questions are generated.

The embodiment of FIG. 8 improves the training of NLPs 128 by providing for automatic question generation based on different relations and arguments in the source text 108, to increase the number of questions inputted to the NLP 128 to train to produce the source text 108 as output.

Figure 9:
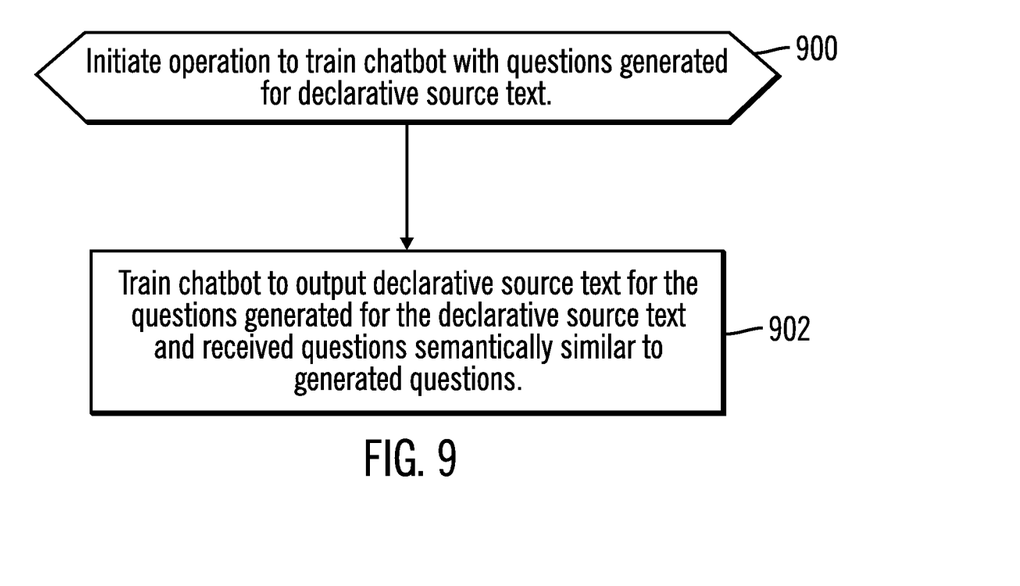
FIG. 9 illustrates an embodiment of operations to use generated questions to train an Internet chatbot.

FIG. 9 illustrates an embodiment of operations to train a chatbot 126 to answer questions in a specific domain. Upon initiating (at block 900) an operation to train (at block 902) the chatbot 126, the chatbot 126 is trained to output the declarative source text 108 for the questions 120 generated for the declarative source text 108 and for received questions semantically similar to or the same as generated questions 120. This will allow the chatbot 126 to answer questions that are the same as or similar to the generated questions 120 with the source text 108. By using the natural language generator (NLG) of the described embodiments, numerous questions 120 can be generated that are closely related to relations and arguments in the source text 108 to use to train the chatbot 126 to answer a greater breadth of questions to improve the usefulness of the chatbot 126 in providing customer support.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
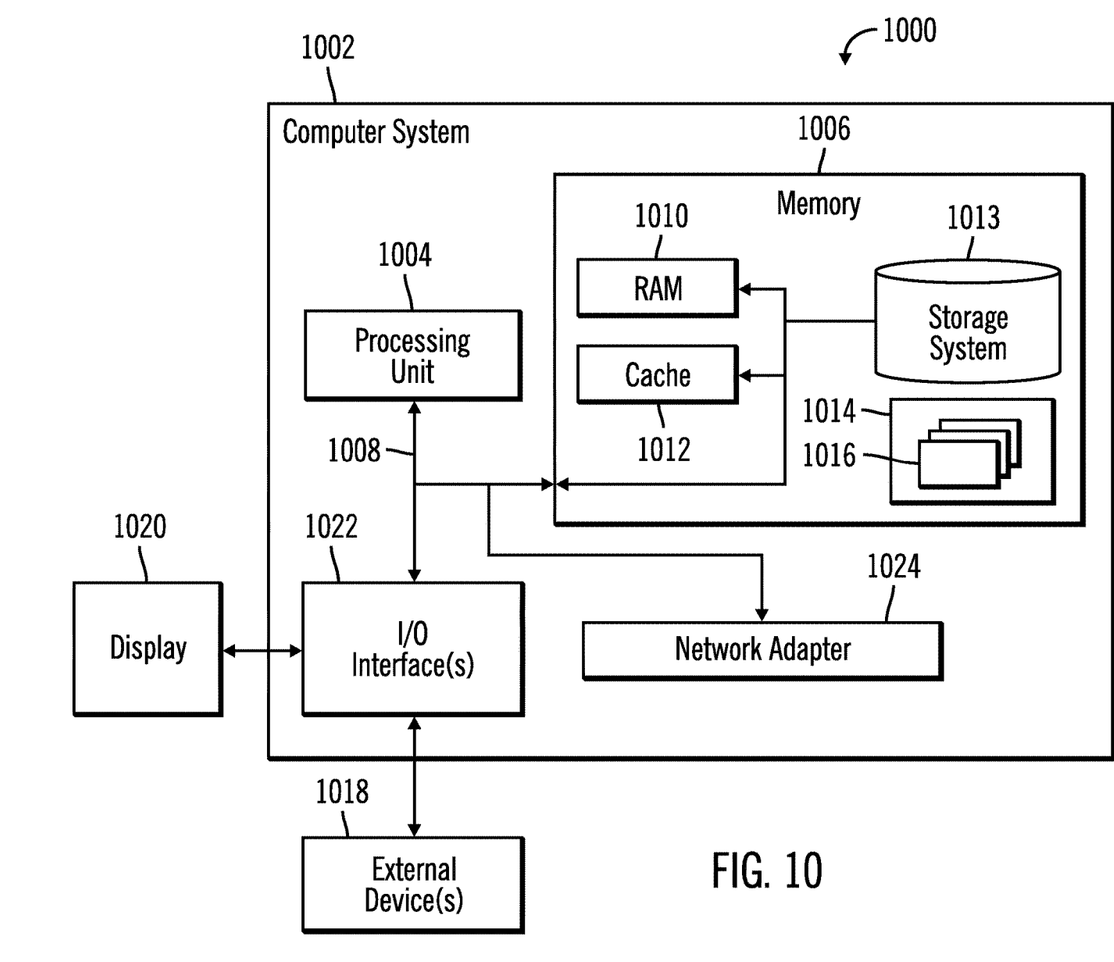
FIG. 10 illustrates a computing environment in which the components of FIG. 1 may be implemented.

The computational components of FIG. 1, including the natural language generator system 100, and all or some of the computational components 110, 112, 114, 118, 126, and 128 may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The letter designators, such as i, m, and n are used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating interrogative questions from declarative source text, wherein the computer program product comprises a computer readable storage medium having program instructions embodied therewith that when executed cause operations, the operations comprising:
    processing the declarative source text to generate a plurality of document plan data structures from the declarative source text, wherein each document plan data structure is based on a portion of the declarative source text, and wherein generating each document plan data structure comprises:
        determining at least one relation of arguments in the portion of the declarative source text;
        indicating the determined at least one relation and the arguments of the determined at least one relation in the document plan data structure; and
        determining a relevancy score for the document plan data structure based on a relation strength of each of the at least one relation of arguments in the declarative source text for the document plan data structure, wherein at least one document plan data structure includes a plurality of relations of arguments and relation strengths from which the relevancy score for the document plan data structure is determined;
    determining document plan data structures of the document plan data structures having a relevancy score greater than a threshold;
    processing, by a natural language generation module, each of the determined document plan data structures having the relevancy score greater than the threshold to generate a plurality of questions; and
    storing the questions with the declarative source text.

2. The computer program product of claim 1, wherein generating each document plan data structure comprises:
    for each determined relation, determining semantic roles of the arguments for the determined relation; and
    indicating the determined semantic roles for the arguments in the document plan data structure.

3. The computer program product of claim 1, wherein the declarative source text includes a plurality of sentences, wherein one document plan data structure is generated for each of the plurality of sentences to indicate the determined at least one relation, the arguments, and a determined entity type for the determined at least one relation.

4. The computer program product of claim 1, wherein generating each document plan data structure comprises:
    determining whether an entity type was determined for the arguments of each relation of the at least one relation;
    indicating in the document plan data structure an entity Boolean value as true in response to determining that an entity type was determined for the arguments of the at least one relation; and
    indicating in the document plan data structure the entity Boolean value as false in response to determining that an entity type was not determined for one of the arguments of the at least one relation, wherein the entity type is not used when generating the questions from the document plan data structure in response to the entity Boolean value being false, and wherein the entity type is used when generating the questions from the document plan data structure in response to the entity Boolean value being true.

5. The computer program product of claim 1, wherein the determining the relevancy score for each document plan data structure further comprises:
    processing the document plan data structure to determine a number of instances of a subject of the at least one relation was referenced in the declarative source text, wherein the determining the relevancy score for the document plan data structure is further based on the determined number of instances of the subject; and
    including the determined relevancy score in the document plan data structure.

6. The computer program product of claim 5, wherein the relevancy score is increased as a number of relations in the document plan data structure increases.

7. The computer program product of claim 1, wherein the determining at least one relation of arguments in the declarative source text comprises determining multiple relations in response to determining that there are multiple relations for the arguments in the declarative source text resulting from alternate interpretations of relations of the arguments in the declarative source text included in the document plan data structure.

8. The computer program product of claim 1, wherein the natural language generation module includes:
    a text simplification module to process the declarative source text to convert individual sentences in the declarative source text into one or more distinct sentences to simplify the declarative source text to produce simplified declarative source text, wherein the document plan data structures are generated from the simplified declarative source text;
    a micro planner module, wherein the micro planner module performs lexicalization to determine natural language words from a dictionary to use for descriptors of the determined at least one relation in the document plan data structures and determines an interrogative type for the questions to generate from the document plan data structures; and
    a surface realizer module to process output from the micro planner module and the document plan data structures to generate the questions.

9. The computer program product of claim 1, wherein the operations further comprise:
    inputting the questions to a machine learning module implementing a natural language processor to train the machine learning module to output the declarative source text based on the questions.

10. The computer program product of claim 1, wherein the operations further comprise:
    inputting the questions to a chatbot to train the chatbot to output the declarative source text in response to receiving questions matching or similar to the questions.

11. A system for generating interrogative questions from declarative source text, comprising:
a processor; and
a computer readable storage medium having program instructions that when executed by the processor cause operations, the operations comprising:
processing the declarative source text to generate a plurality of document plan data structures from the declarative source text, wherein each document plan data structure is based on a portion of the declarative source text, and wherein generating each document plan data structure comprises:
determining at least one relation of arguments in the portion of the declarative source text;
indicating the determined at least one relation and the arguments of the determined at least one relation in the document plan data structure; and
determining a relevancy score for the document plan data structure based on a relation strength of each of the at least one relation of arguments in the declarative source text for the document plan data structure, wherein at least one document plan data structure includes a plurality of relations of arguments and relation strengths from which the relevancy score for the document plan data structure is determined;
determining document plan data structures of the document plan data structures having a relevancy score greater than a threshold;
processing, by a natural language generation module, each of the determined document plan data structures having the relevancy score greater than the threshold to generate a plurality of questions; and
storing the questions with the declarative source text.

12. The system of claim 11, wherein the declarative source text includes a plurality of sentences, wherein one document plan data structure is generated for each of the plurality of sentences to indicate the determined at least one relation, the arguments, and a determined entity type for the determined at least one relation.

13. The system of claim 11, wherein the determining the relevancy score for each document plan data structure further comprises:
processing the document plan data structure to determine a number of instances a subject of the at least one relation was referenced in the declarative source text, wherein the determining the relevancy score for the document plan data structure is further based on the determined number of instances of the subject; and
including the determined relevancy score in the document plan data structure.

14. The system of claim 11, wherein the natural language generation module includes:
a text simplification module to process the declarative source text to convert individual sentences in the declarative source text into one or more distinct sentences to simplify the declarative source text to produce simplified declarative source text, wherein the document plan data structures are generated from the simplified declarative source text;
a micro planner module, wherein the micro planner module performs lexicalization to determine natural language words from a dictionary to use for descriptors of the determined at least one relation in the document plan data structures and determines an interrogative type for the questions to generate from the document plan data structures; and
a surface realizer module to process output from the micro planner module and the document plan data structures to generate the questions.

15. The system of claim 11, wherein the operations further comprise:
inputting the questions to a machine learning module implementing a natural language processor to train the machine learning module to output the declarative source text based on the questions.

16. A computer implemented method for generating interrogative questions from declarative source text, comprising:
processing the declarative source text to generate a plurality of document plan data structures from the declarative source text, wherein each document plan data structure is based on a portion of the declarative source text, and wherein generating each document plan data structure comprises:
determining at least one relation of arguments in the portion of the declarative source text;
indicating the determined at least one relation and the arguments of the determined at least one relation in the document plan data structure; and
determining a relevancy score for the document plan data structure based on a relation strength of each of the at least one relation of arguments in the declarative source text for the document plan data structure, wherein at least one document plan data structure includes a plurality of relations of arguments and relation strengths from which the relevancy score for the document plan data structure is determined;
determining document plan data structures of the document plan data structures having a relevancy score greater than a threshold;
processing, by a natural language generation module, each of the determined document plan data structures having the relevancy score greater than the threshold to generate a plurality of questions; and
storing the questions with the declarative source text.

17. The method of claim 16, wherein the declarative source text includes a plurality of sentences, wherein one document plan data structure is generated for each of the plurality of sentences to indicate the determined at least one relation, the arguments, and a determined entity type for the determined at least one relation.

18. The method of claim 16, wherein the determining the relevancy score for each document plan data structure further comprises:
processing the document plan data structure to determine a number of instances of a subject of the at least one relation was referenced in the declarative source text, wherein the determining the relevancy score for the document plan data structure is further based on the determined number of instances of the subject; and
including the determined relevancy score in the document plan data structure.

19. The method of claim 16, wherein the natural language generation module includes:
a text simplification module to process the declarative source text to convert individual sentences in the declarative source text into one or more distinct sentences to simplify the declarative source text to produce simplified declarative source text, wherein the document plan data structures are generated from the simplified declarative source text;
a micro planner module, wherein the micro planner module performs lexicalization to determine natural language words from a dictionary to use for descriptors of the determined at least one relation in the document plan data structures and determines an interrogative type for the questions to generate from the document plan data structures; and a surface realizer module to process output from the micro planner module and the document plan data structures to generate the questions.

20. The method of claim 16, further comprising:

inputting the questions to a machine learning module implementing a natural language processor to train the machine learning module to output the declarative source text based on the questions.

* * * * *